(12) United States Patent
Fenelon

(10) Patent No.: US 8,848,213 B2
(45) Date of Patent: Sep. 30, 2014

(54) OBJECT-BASED NETWORK SCANNING

(75) Inventor: Michael P. Fenelon, Bothel, WA (US)

(73) Assignee: Microsoft Corporation, Redmond, WA (US)

( * ) Notice: Subject to any disclaimer, the term of this patent is extended or adjusted under 35 U.S.C. 154(b) by 1258 days.

(21) Appl. No.: 12/050,920

(22) Filed: Mar. 18, 2008

(65) Prior Publication Data

US 2009/0240697 A1    Sep. 24, 2009

(51) Int. Cl.
*H04N 1/32* (2006.01)
*G06F 15/16* (2006.01)
*G06F 17/30* (2006.01)

(52) U.S. Cl.
CPC .. *G06F 17/30011* (2013.01); *H04N 2201/3242* (2013.01); *H04N 2201/3276* (2013.01); *H04N 2201/3274* (2013.01); *H04N 2201/3277* (2013.01); *H04N 1/32037* (2013.01); *H04N 2201/3273* (2013.01)
USPC .......................................... 358/1.15; 358/403

(58) Field of Classification Search
None
See application file for complete search history.

(56) References Cited

U.S. PATENT DOCUMENTS

| | | | |
|---|---|---|---|
| 6,868,424 B2 * | 3/2005 | Jones et al. ................... | 707/822 |
| 7,289,989 B2 | 10/2007 | Bou-Ghannam et al. | |
| 7,843,586 B2 * | 11/2010 | Ferlitsch ...................... | 358/1.15 |
| 8,245,137 B2 * | 8/2012 | Jones et al. ................... | 715/272 |
| 2003/0093583 A1 | 5/2003 | Doran et al. | |
| 2003/0103232 A1 * | 6/2003 | Twede ......................... | 358/1.15 |
| 2004/0006596 A1 * | 1/2004 | Kato ............................ | 709/206 |
| 2004/0070613 A1 * | 4/2004 | Sprague et al. ............... | 345/762 |
| 2004/0122926 A1 | 6/2004 | Moore et al. | |
| 2004/0205758 A1 * | 10/2004 | Hikawa et al. ................ | 718/102 |
| 2004/0243920 A1 * | 12/2004 | Kato ............................. | 715/500 |
| 2005/0078336 A1 * | 4/2005 | Ferlitsch ...................... | 358/1.15 |
| 2005/0080844 A1 * | 4/2005 | Dathathraya et al. ......... | 709/201 |
| 2006/0085852 A1 | 4/2006 | Sima | |
| 2006/0106866 A1 | 5/2006 | Green et al. | |
| 2006/0126110 A1 * | 6/2006 | Ohara et al. ................. | 358/1.15 |
| 2006/0168136 A1 | 7/2006 | Bethlehem et al. | |
| 2006/0195491 A1 * | 8/2006 | Nieland et al. ............... | 707/204 |
| 2006/0256392 A1 * | 11/2006 | Van Hoof et al. ............ | 358/402 |
| 2007/0011325 A1 | 1/2007 | Williams | |
| 2007/0146732 A1 * | 6/2007 | Piazza et al. .................. | 358/1.1 |
| 2007/0150329 A1 * | 6/2007 | Brook et al. ..................... | 705/8 |

(Continued)

OTHER PUBLICATIONS

Hines, "Watchfire Adds Web Services Scanning", Jul. 17, 2006, Ziff Davis Enterprise Inc., pp. 4.

(Continued)

*Primary Examiner* — Scott A Rogers
(74) *Attorney, Agent, or Firm* — John Jardine; Andrew Sanders; Micky Minhas

(57) ABSTRACT

In accordance with one or more aspects, a user selects one or more capabilities of a repository service and one or more capabilities of a scanner. A scan object including both acquisition parameters based on the selected one or more capabilities of the scanner and post-scan instructions based on the selected one or more capabilities of the repository service is generated and stored for subsequent access by the scanner. At the scanner, multiple scan objects available to a user of the scanner are identified. One or more electronic documents are created by scanning one or more documents using the acquisition parameters in the selected scan object. Both the post-scan instructions in the selected scan object and the one or more electronic documents are sent to a service identified in the scan object, where the post-scan instructions are processed.

20 Claims, 6 Drawing Sheets

(56) References Cited

U.S. PATENT DOCUMENTS

| | | |
|---|---|---|
| 2007/0150574 A1 | 6/2007 | Mallal et al. |
| 2007/0279667 A1* | 12/2007 | Hattori et al. ............... 358/1.13 |
| 2007/0282799 A1 | 12/2007 | Alba et al. |
| 2008/0137129 A1* | 6/2008 | Ferlitsch ..................... 358/1.15 |
| 2008/0162626 A1* | 7/2008 | Yoon ............................ 709/202 |
| 2008/0189631 A1* | 8/2008 | Emerson ...................... 715/764 |
| 2008/0204800 A1* | 8/2008 | Ushiku ........................ 358/1.15 |
| 2008/0252936 A1* | 10/2008 | Stratton ........................ 358/403 |
| 2009/0063710 A1* | 3/2009 | Sekine et al. .................... 710/1 |
| 2009/0063718 A1* | 3/2009 | Sekine et al. .................... 710/8 |

OTHER PUBLICATIONS

"Managing Web Services Security with Assessment Management Platform (AMP)", SPI Dynamics Inc., 2007, pp. 1-2.

"AppScan Standard Edition Version 7.7 Quick Start Guide", Version 7.7, IBM Corporation., 2007, pp. 2.

* cited by examiner

OBJECT-BASED NETWORK SCANNING

BACKGROUND

Scanners coupled to computer networks have become commonplace, oftentimes in the form of a multi-function device that also includes printing and/or faxing capabilities. Coupling such scanners to a network allows a single scanner to be shared by multiple users, reducing the cost of purchasing and maintaining the scanners. However, problems remain with these scanners. One such problem is that the manufacturers of the scanners typically need to create the support for different post-scan operations, such as emailing a scanned document or storing the scanned document at a particular location on the network. Providing such support can be very time consuming and costly for the manufacturers. Additionally, once coupled to the network, an administrator typically needs to configure the scanners to be able to perform the different post-scan operations on that network. This is time consuming for the administrator, and is made more difficult due to different scanner manufacturers using different designs, requiring the administrator to understand the different manners in which the different scanners are to be configured.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects of the object-based network scanning, multiple scan objects available to a user of the scanner are identified, each scan object identifying acquisition parameters and post-scan instructions. A user selection of one of the multiple scan objects is received, and one or more electronic documents are created by scanning one or more documents using the acquisition parameters in the selected scan object. Both the post-scan instructions in the selected scan object and the one or more electronic documents are sent to a service identified in the scan object.

In accordance with one or more aspects of the object-based network scanning, an indication of capabilities of a repository service and an indication of capabilities of a scanner are retrieved. The capabilities of the repository service and the capabilities of the scanner are presented to a user, and a user selection of one or more of the capabilities of the repository service and one or more of the capabilities of the scanner is received. A scan object including both acquisition parameters based on the selected one or more capabilities of the scanner and post-scan instructions based on the one or more of the capabilities of the repository service is generated and stored for subsequent access by the scanner.

In accordance with one or more aspects of the object-based network scanning, one or more electronic documents acquired by a scanner are received from the scanner. Additionally, post-scan instructions from a scan object identifying post-scan operations to be performed by a repository service are received, the scan object having been generated based at least in part on both capabilities of the repository service previously identified by a service on the device and capabilities of the scanner previously identified by a service on the scanner. The one or more electronic documents are processed based at least in part on the post-scan instructions.

BRIEF DESCRIPTION OF THE DRAWINGS

The same numbers are used throughout the drawings to reference like features.

DETAILED DESCRIPTION

Object-based network scanning is discussed herein. An administrator using a computing device coupled to the network can retrieve the capabilities of each scanner coupled to the network as well as the capabilities of each repository service that performs post-scan processing (e.g., storage of scanned documents, emailing of scanned documents, and so forth). Using these capabilities, the administrator can select a combination of scanner settings and post-scan processing instructions and store this combination as a scan object. Subsequently, a user at the scanner can access various scan objects and select one of those objects. The user can then have his or her documents scanned using the scanner settings indicated in the selected scan object, and have the scanned documents processed by the repository service using the post-scan processing instructions indicated in the selected scan object.

Figure 1:
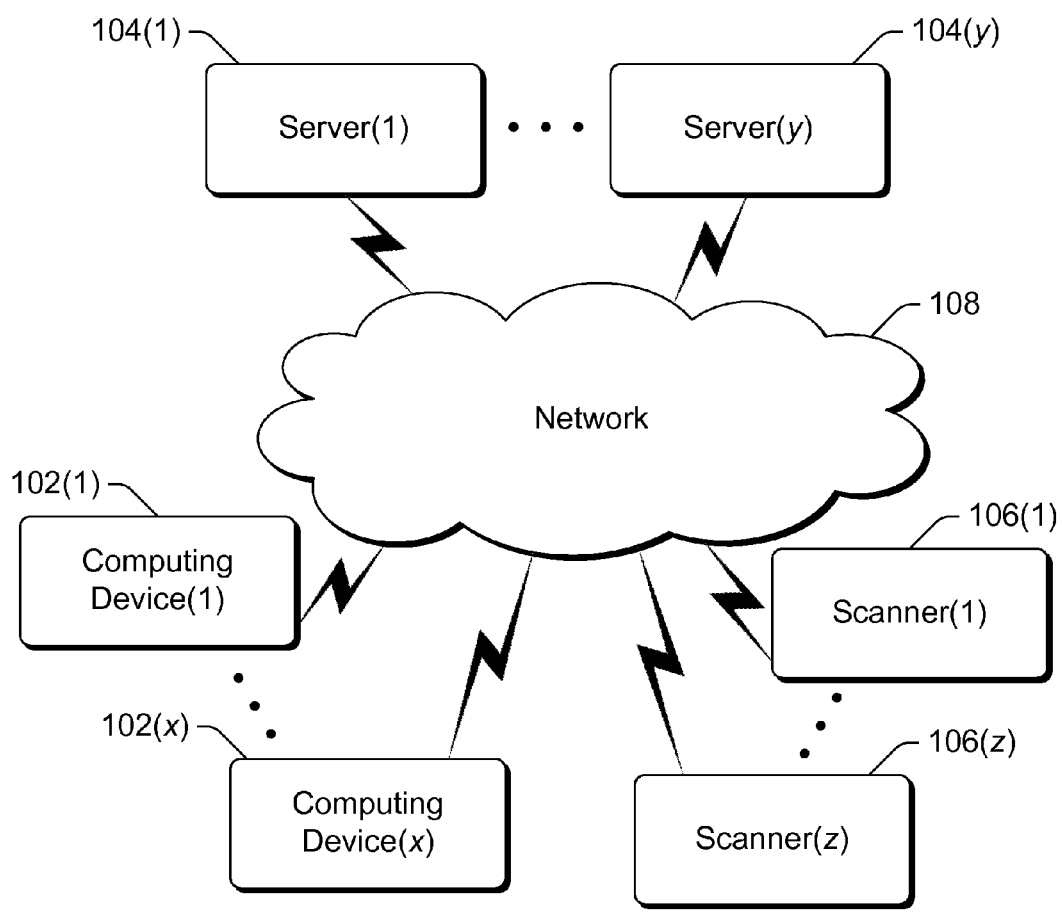
FIG. 1 illustrates an example system implementing the object-based network scanning in accordance with one or more embodiments.

FIG. 1 illustrates an example system 100 implementing the object-based network scanning in accordance with one or more embodiments. System 100 includes one or more (x) computing devices 102(1-*x*), one or more (y) servers 104(1-*y*), and one or more (z) scanners 106(1-*z*) coupled together via a network 108. Network 108 can be any of a variety of networks, including the Internet, a local area network (LAN), a public telephone network, an intranet, other public and/or proprietary networks, combinations thereof, and so forth. Network 108 can support wired and/or wireless communications.

Computing devices 102 can be any of a variety of types of devices. For example, a computing device 102 can be a desktop computer, a mobile station, an entertainment appliance, a set-top box communicatively coupled to a display device, a wireless phone, a game console, an automotive computer, and so forth. Thus, computing devices 102 may range from a full resource device with substantial memory and processor resources (e.g., personal computers, game consoles) to a low-resource device with limited memory and/or processing resources (e.g., traditional set-top boxes, hand-held game consoles). Different computing devices 102 can be the same types of devices and/or different types of devices.

Servers 104 can also be any of a variety of different types of devices. Similar to the discussion of computing devices 102, servers 104 can be any of a variety of different devices, ranging from full resource devices with substantial memory and processor resources to a low-resource device with limited memory and/or processing resources. Different servers 104 can be the same types of devices and/or different types of devices.

Scanners 106 can be any of a variety of different types of scanning devices. For example, a scanner 106 can be a flat-bed scanner, a sheet-fed scanner, a camera, or any of a variety of other document imaging devices. Scanners 106 can be dedicated scanning devices, or alternatively can be incorporated with other functionality. For example, a scanner 106 can be incorporated as part of a multi-function device that can scan documents and print documents, as part of a multi-function device that can scan documents and fax documents, and so forth.

Figure 2:
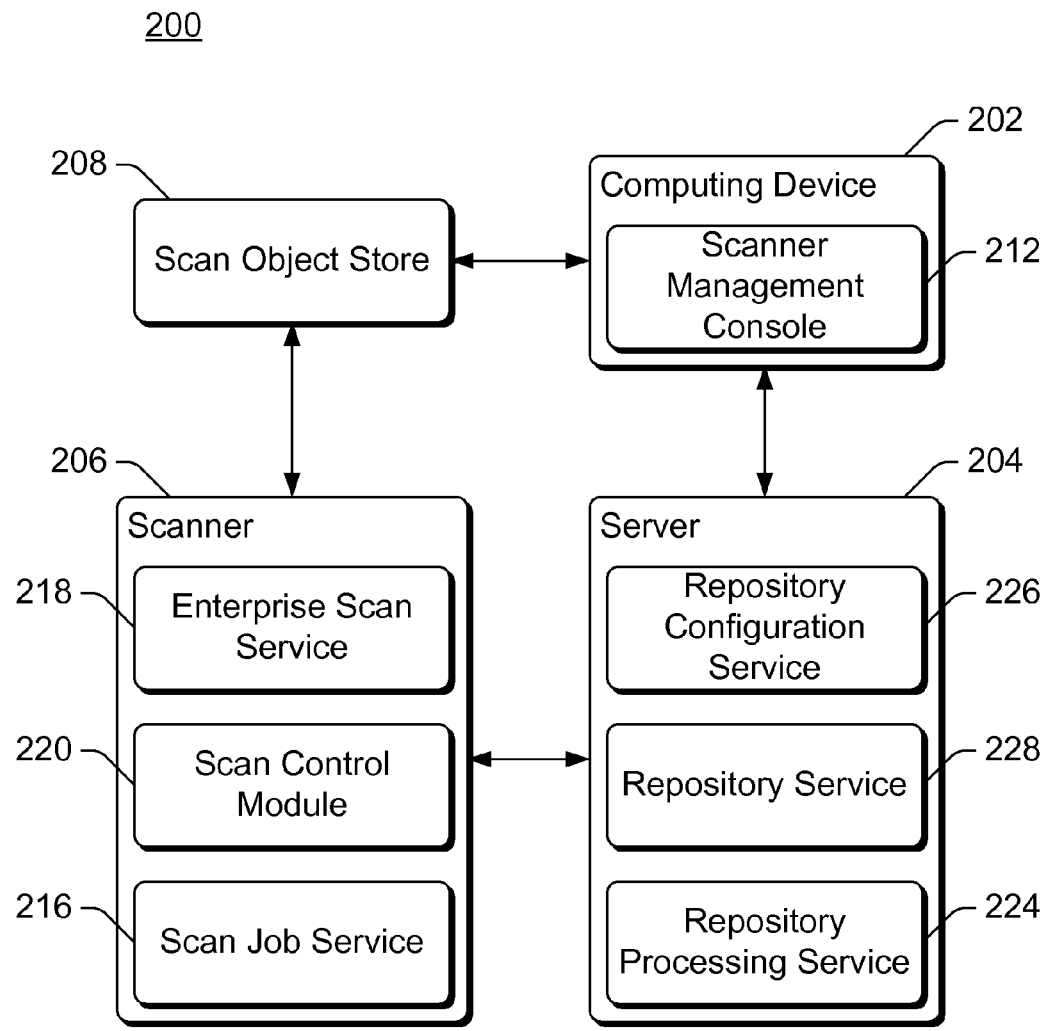
FIG. 2 illustrates an example system including a computing device, server, scanner, and scan object store in accordance with one or more embodiments of the object-based network scanning.

FIG. 2 illustrates an example system 200 including a computing device 202, server 204, scanner 206, and scan object store 208 in accordance with one or more embodiments of the object-based network scanning. In FIG. 2, for example, computing device 202 can be any of the computing devices 102 of FIG. 1, sever 204 can be any of the servers 104 of FIG. 1, and scanner 206 can be any of the scanners 106 of FIG. 1. It is to be appreciated that multiple computing devices 202, servers 204, and/or scanners 206 can be used as shown in FIG. 1, although only a single computing device 202, server 204, and scanner 206 is shown in FIG. 2 for ease of discussion.

Computing device 202 includes a scanner management console 212. Scanner management console 212 allows a user of computing device 202 to retrieve information describing the capabilities of services running on server 204, and also retrieve information describing the capabilities of scanner 206. The capabilities of services running on server 204 refer to the post-scan operations that can be performed by the services running on server 204, and the capabilities of scanner 206 refer to the possible acquisition parameters of scanner 206. These various capabilities are presented to a user of computing device 202 and the user can select various combinations of these capabilities. Scanner management console 212 then generates a scan object that includes both the user-selected capabilities of the services running on server 204 and the user-selected acquisition parameters of scanner 206.

Additionally, the user of console 212 can also input various information or parameters for the post-scan operations to be performed by the services running on server 204. For example, if a post-scan operation is to include emailing electronic documents to particular email addresses, then those particular email addresses can be input by the user of console 212 and included in the scan object. By way of another example, if a post-scan operation is to include faxing documents to a particular phone number, then that particular phone number can be input by the user of console 212 and included in the scan object.

In one or more embodiments the user can also enter a user-friendly description for the scan object. This user-friendly description is stored as part of the scan object and allows users of scanners 106 to more easily identify which particular scan object they want to use when scanning a document. For example, such user-friendly descriptions might include "expense reports" for scan objects intended to be used when scanning in documents for expense reports, "timesheets" for scan objects intended to be used when scanning in timesheet documents, and so forth.

This scan object generated by console 212 is stored on scan object store 208, which maintains the scan objects generated by console 212. Scanner 206 can subsequently access scan object store 208 to retrieve scan objects as discussed in more detail below. In one or more embodiments, scan object store 208 is implemented as an Active Directory® directory service. Additional information regarding the Active Directory® directory service is available from Microsoft Corporation of Redmond, Wash. Although scan object store 208 is illustrated separately in FIG. 2, scan object store 208 can alternatively be implemented on another device in system 200, such as server 204 or another server or computing device (not shown).

Additionally, the user of console 212 can optionally associate user access rights with the scan object, the user access rights identifying one or more users to which the scan object is to be made available. The user access rights can identify individual users, groups of users, all users (e.g., no restrictions on who the scan object is made available to), and so forth. In one or more embodiments, these user access rights are assigned and managed using the Active Directory® directory service.

Additionally, the user of console 212 can optionally associate a particular scanner 206 with the scan object. Such an association can be assigned and managed analogous to the user access rights discussed above, or alternatively can be managed in different manners (e.g., by including an indication in the scan object of the particular scanner(s) 206 associated with the scan object). When such associations are used, a particular scanner 206 only has access to those scan objects with which it is associated. This allows the user of console 212 to, for example, generate different scan objects with different acquisition parameters for different scanners.

Scanner 206 includes a scan job service 216, an enterprise scan service 218, and a scan control module 220. Scan control module 220 manages the acquisition of electronic documents, controlling the scanning process and generating electronic documents as documents are scanned. These electronic documents are electronic or digital representations of the documents that are scanned, and can be stored in accordance with any of a variety of different proprietary and/or public formats. For example, the electronic documents can be stored as JPEG images, TIFF images, PDF files, and so forth.

Enterprise scan service 218 communicates with scanner management console 212. Console 212 accesses enterprise scan service 218 to obtain the capabilities of scanner 206. These capabilities refer to the scanning or acquisition parameters for scanner 206. Examples of such parameters include possible resolution settings for the scanner, whether the scanner can generate color electronic documents or only black and white electronic documents, whether the scanner is a flat-bed scanner, whether the scanner includes an automatic document feeder (ADF), the largest size document that can be scanned by the scanner, how quickly the scanner can scan documents, electronic document formats used by the scanner, and so forth. Some of these capabilities refer to parameters that the user can select via console 212, while other capabilities are informational so that the user can decide whether to create a scan object for scanner 206. For example, the user could select, via console 212, a particular scan resolution for scanner 206. However, if the scanner only has an ADF and the user desires documents to be scanned in via a flat-bed scanner, then the user would select a different scanner for which the scan object is to be created.

Scan job service 216 receives user credentials from a user of scanner 206. These user credentials can be, for example, a user id and password entered by the user, a fingerprint entered by the user, a card key presented by the user, and so forth. Scan job service 216 can optionally access a credential verification component to verify that the user has access to the network (e.g., verify a user id and password combination, verify that the user id on a card key is valid, and so forth). This credential verification component can be included as part of scanner 206 or alternatively on another device (e.g., server 204 or another server).

Scan job service 216 also accesses scan object store 208 and retrieves scan objects (or identifiers of scan objects) that are available to the user of scanner 206. As discussed above, different scan objects can have different user rights associated with them. These user rights are maintained as part of scan object store 208, and can be retrieved by scanner 206. Additionally, in one or more embodiments different scan objects are associated with different scanners. Accordingly, in such embodiments scan job service 216 retrieves only those scan objects (or identifiers of those scan objects) that are available to the user of scanner 206 and that are associated with scanner 206.

Scan job service 216 presents identifiers of these retrieved scan objects to the user and allows the user to select one of the retrieved scan objects. The user can select a particular scan object in any of a variety of manners, such as using arrow keys to highlight an identifier of scan object on a display and selecting an "ok" or "select" key, entering a verbal command identifying one of the scan objects, entering a key code identifying a particular scan object (e.g., the key codes can be displayed along with user-friendly descriptions of the scan objects) using a number pad on scanner 206, and so forth. In response to the user selection of a particular scan object, the selected scan object is retrieved from scan object store 208 if it has not already been retrieved.

Scan job service 216 provides the acquisition parameters from the selected scan object to scan control module 220 so that the user's documents can be scanned using the appropriate acquisition parameters. One or more of these parameters can optionally be overridden by the user entering different parameters at scanner 206.

After the documents are scanned in (or alternatively, as the documents are scanned in), scan job service 216 obtains the electronic documents from scan control module 220. Scan job service 216 sends these obtained electronic documents to server 204 along with the post-scan instructions from the selected scan object. The selected scan object itself can be forwarded to server 204, or alternatively only the post-scan instructions may be forwarded to server 204. Alternatively, an identifier of the selected scan object can be forwarded to server 204 and server 204 can access scan object store 208 to retrieve the post-scan instructions from the identified scan object.

This acquiring electronic documents, forwarding those electronic documents to server 204, and processing of those electronic documents at server 204 in accordance with the post-scan instructions is also referred to as a scan job. The processing of those electronic documents at server 204 in accordance with the post-scan instructions is also referred to as a post-scan job.

In one or more embodiments, scan job service 216 also receives status information from server 204 regarding the status of various scan jobs that have been submitted by scanner 206. This status could include, for example, that the job has been completed (e.g., all post-scan instructions have been performed), that the job is in process (e.g., the post-scan instructions are being performed), that there was an error with one of the post-scan instructions and the job cannot be completed, and so forth. Scan job service 216 can submit requests to server 204 for status at various times (e.g., in response to a user of scanner 206 requesting a status of a particular scan job), or receives notifications at regular or irregular intervals from server 204.

The status of various scan jobs can also be presented to a user of scanner 206. For example, the user can scroll through past scan jobs that he or she submitted (or alternatively that all users of scanner 206 submitted) and identify their status. The user could also input a particular scan job (e.g., using some reference number or other identifier given to the user by scanner 206 when the user scanned his or her documents) and receive a status for that particular scan job.

Server 204 includes a repository processing service 224, a repository configuration service 226, and a repository service 228. Although services 224-228 are illustrated as being part of the same server 204, alternatively each of services 224-228 can be distributed across multiple servers, and/or different ones of services 224-228 can be located on different servers. In one or more embodiments, each of services 224-226 is a web service that can communicate with other components or devices over a network using publicly available standard protocols. Alternatively, services 224-226 can be implemented in other manners using proprietary and/or non-standard protocols. In one or more embodiments, services 224-226 are implemented using the Web Services on devices technology. Additional information on the Web Services technology is available from Microsoft Corporation of Redmond, Wash.

Repository service 228 (also referred to as repository 228) receives electronic documents that have been scanned and performs post-scan operations on the received documents. Any of a variety of different post-scan operations can be performed, such as one or more of emailing the received documents to various recipients, storing the documents in a particular shared folder or on a particular shared storage device, storing the documents in a particular database, saving the documents to a particular content management server or system, faxing the received documents to various recipients, and so forth. The particular post-scan operations that are performed are based on the capabilities of repository 228 as well as instructions received from scanner 206 as discussed in more detail below.

Repository processing service 224 receives electronic documents and corresponding post-scan instructions from scan job service 216. Repository processing service 224 provides the electronic documents and corresponding post-scan instructions that it receives to repository service 228, which in turn performs the post-scan instructions. Repository processing service 224 can optionally access the scan object store 208 to retrieve the post-scan instructions if repository processing service 224 receives an identifier of a scan object rather than the specific post-scan instructions, or alternatively if repository processing service 224 desires to verify or validate the post-scan instructions it has received.

Repository processing service 224 also monitors the performance of the post-scan instructions by repository 228 and sends status information to scan job service 216. In one or more embodiments repository 228 notifies processing service 224 each time a post-scan instruction is completed, allowing processing service 224 to track which portions of each scan job have been completed by repository 228. Alternatively, other mechanisms can be used, such as repository 228 returning a status of a scan job to processing service 224 whenever processing service 224 requests the status of the scan job.

Repository configuration service 226 receives requests from scanner management console 212 for information regarding the capabilities of repository service 228 running on server 204. These capabilities are the post-scan operations that are supported by repository service 228. For example, if repository 228 is able to email electronic documents then the emailing capability is identified as one of the capabilities of repository service 228.

Various other status information regarding server 204 and/or scan jobs can also be returned to scanner management console 212 by repository configuration service 226. This information can include, for example, a status of the server 204 such as is server 204 running properly or is it malfunctioning, whether repository service 228 is running, and so forth. Repository configuration service 226 can also return information regarding the status of jobs, similar to that returned to scanner 206 as discussed above. However, status information returned to scanner 206 is typically limited to scan jobs submitted by the particular scanner 206 and/or submitted by a particular user of scanner 206, whereas the status information returned to scanner management console 212 is typically for all scan jobs submitted to repository service 228 by all scanners and/or all users.

Figure 3:
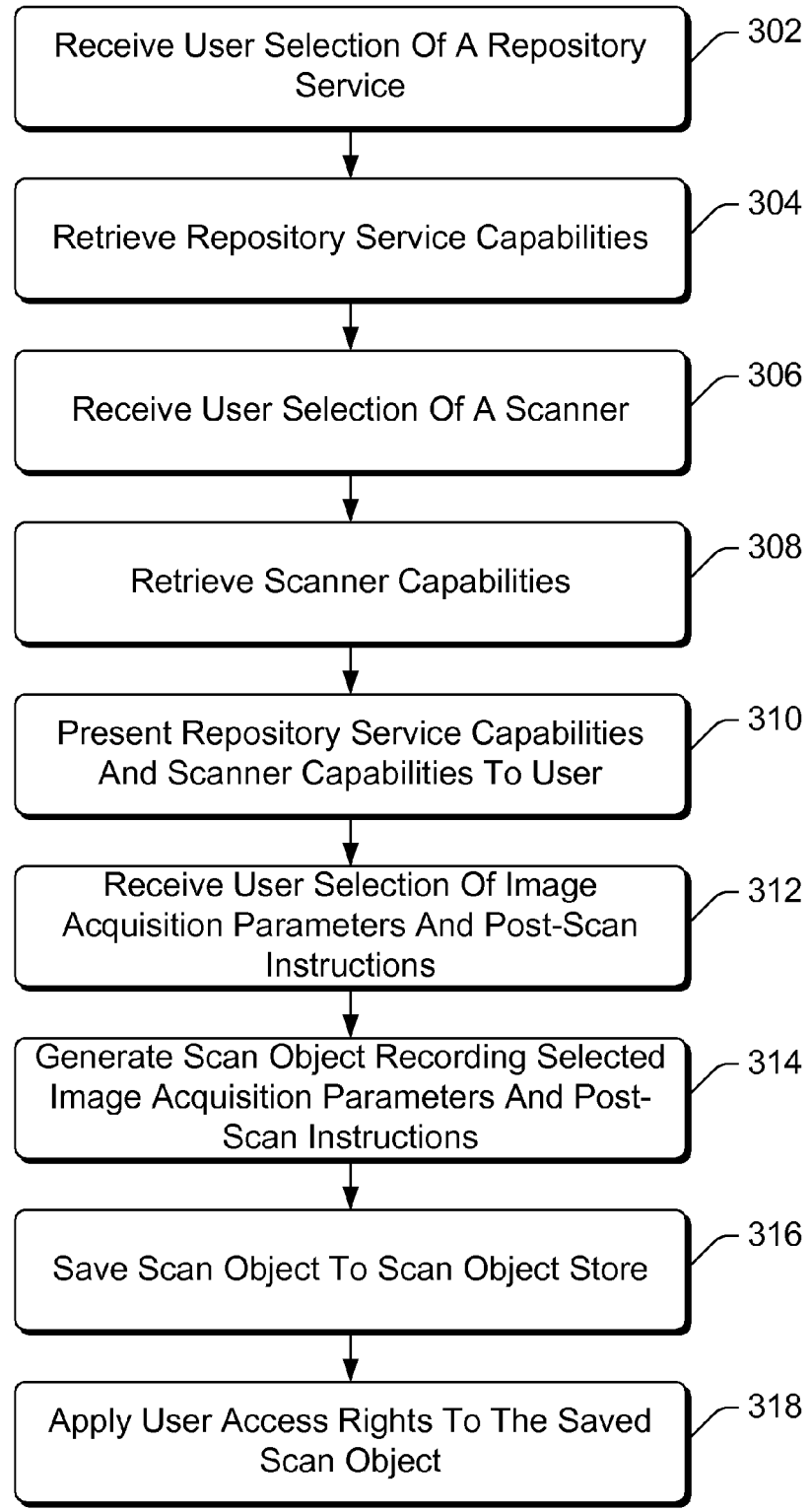
FIG. 3 is a flowchart illustrating an example process for generating a scan object in accordance with one or more embodiments.

FIG. 3 is a flowchart illustrating an example process 300 for generating a scan object in accordance with one or more embodiments. Process 300 is carried out by a scanner management console of a device, such as console 212 of FIG. 2, and can be implemented in software, firmware, hardware, or combinations thereof.

Initially, a user selection of a repository service is received (act 302). This user selection can be received in any of a variety of different manners, such as allowing a user to highlight a particular one of multiple repositories displayed to the user, receiving a user-input alphanumeric identifier of a particular repository, receiving a voice command from the user, and so forth. Alternatively, if only a single repository service is available then that repository service can be automatically selected without user input.

An indication of the capabilities of the repository service selected in act 302 is retrieved (act 304). In one or more embodiments, these capabilities are retrieved from a service running on the same server as the repository service, such as repository configuration service 226 of FIG. 2. Alternatively, these capabilities can be received from other locations, such as a central database or other record of repository service capabilities, a local cache of previously retrieved repository service capabilities, and so forth.

A user selection of a scanner is also received (act 306). This user selection can be received in any of a variety of different manners, analogous to the selection of a repository service discussed above with respect to act 302. Alternatively, if only a single scanner is available then that scanner can be automatically selected without user input.

An indication of the capabilities of the scanner selected in act 306 is retrieved (act 308). In one or more embodiments, these capabilities are retrieved from a service running on the scanner, such as enterprise scan service 218 of FIG. 2. Alternatively, these capabilities can be received from other locations, such as a central database or other record of scanner capabilities, a local cache of previously retrieved scanner capabilities, and so forth.

The retrieved repository service capabilities and retrieved scanner capabilities are presented to the user (act 310). These capabilities can be presented to the user in any of a variety of different manners. In one or more embodiments, a listing of all the capabilities are presented to the user, although other techniques can be used such as drop-down menus, audible outputs, and so forth.

A user selection of image acquisition parameters and post-scan instructions are received (act 312). The selected image acquisition parameters are based on the capabilities of the scanner. As discussed above, not all capabilities of the scanner may be selectable. For example, a user could select a particular scanning resolution as an image acquisition parameter for the scanner, but would not be able to select scanning as a flat-bed scanner if the scanner only supports an automatic document feeder. In one or more embodiments, the capabilities that correspond to user-selectable image acquisition parameters are displayed in one manner to the user (e.g., a drop-down menu from which a scanning resolution can be selected, a drop-down menu from which a color or black and white selection can be made, and so forth), while those that are only informational and cannot be selected (e.g., the scanner being a flat-bed scanner with no automatic document feeder) being displayed in a different manner (e.g., a listing of capabilities).

The selected post-scan instructions are based on the capabilities of the repository service. Particular operations can be displayed to and selected by the user, such as emailing the electronic documents, saving the electronic documents to a particular folder or server, and so forth. Additional information can also be input by the user in act 312. For example, if a selected post-scan instruction is emailing of the electronic documents, then the user can also input the email addresses of the intended recipients of the electronic documents. These email addresses can be input in different manners, such as being typed in using a keyboard, being selected from an address book, and so forth.

A scan object is generated including the user-selected image acquisition parameters and the user-selected post-scan instructions (act 314). This scan object is saved to a scan object store (act 316) as discussed above. In addition to the image acquisition parameters and post-scan instructions, the scan object includes a user-friendly identifier of the scan object. This user-friendly identifier allows users of the scanner to easily identify a particular scan object they want to use. For example, a scan object including parameters and instructions for scanning and emailing expense reports could include an identifier of "expense report", while a scan object including parameters and instructions for scanning and storing time sheets could include an identifier of "timesheets".

User access rights are also optionally applied to the scan object (act 318). The user access rights identify which user(s) are able to access the scan object. As discussed above, the user access rights can identify individual users, groups of users, all users, and so forth.

Figure 4:
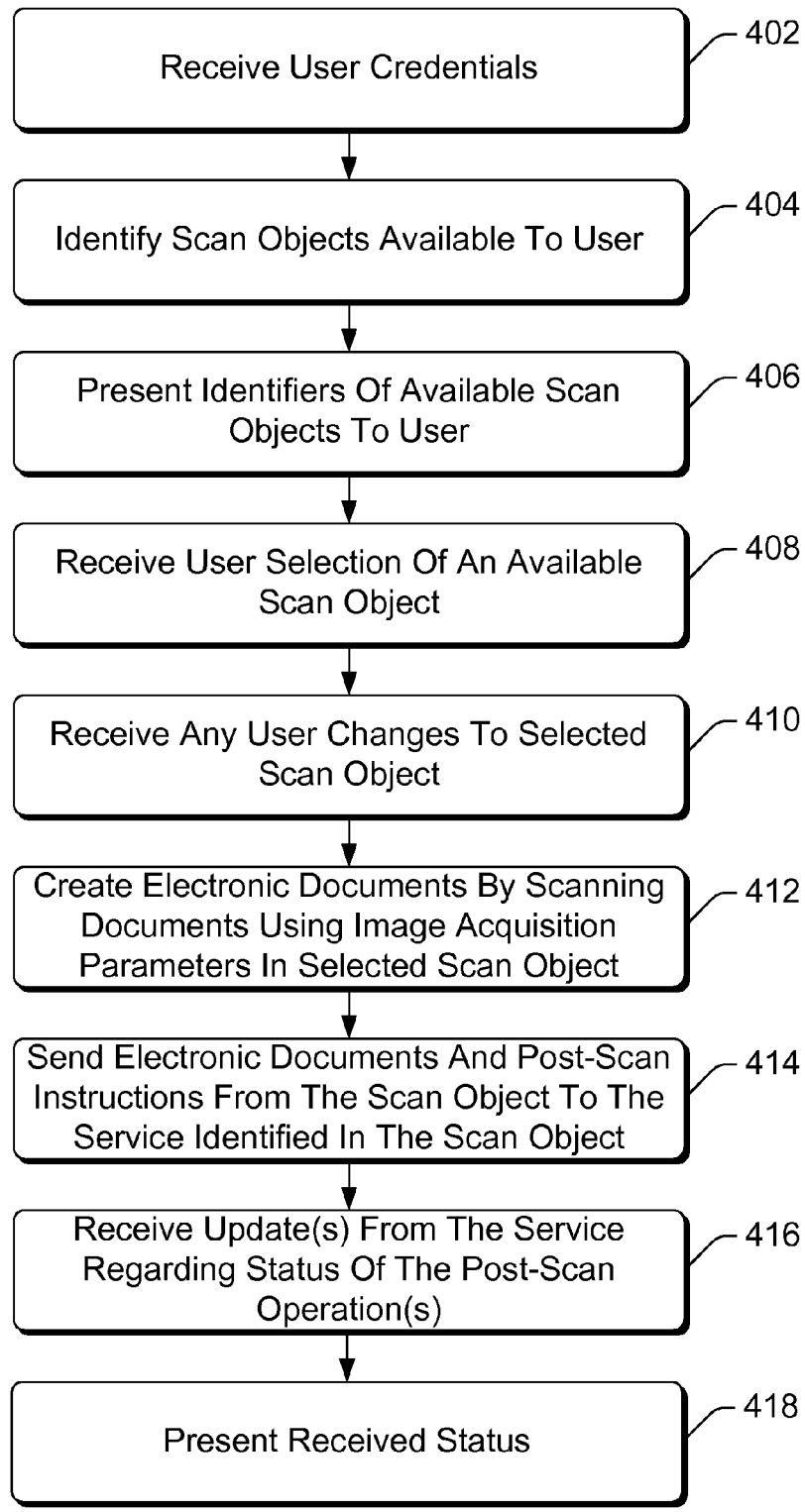
FIG. 4 is a flowchart illustrating an example process for scanning and performing operations based on a scan object in accordance with one or more embodiments.

FIG. 4 is a flowchart illustrating an example process 400 for scanning and performing operations based on a scan object in accordance with one or more embodiments. Process 400 is carried out by a scanner, such as scanner 206 of FIG. 2, and can be implemented in software, firmware, hardware, or combinations thereof.

Initially, user credentials are received (act 402). As discussed above, these user credentials identify the user of scanner 206, and can take any of a variety of different forms such as user id and password, fingerprint, card key or smart card, and so forth. Alternatively, if no user access rights are used and all users can access all scan objects, then no user credentials need be received in act 402.

Scan objects available to the user are then identified (act 404). User access rights are applied to scan objects as discussed above, so the scan objects identified in act 404 are those scan objects that the user is given individual access to, or those scan objects that a group (of which the user is a member) has been given access to. Alternatively, all users may be able to access all scan objects, in which case user access rights need not be implemented and all scan objects are identified in act 404.

Identifiers of the available scan objects identified in act 404 are presented (e.g., displayed) to the user (act 406), and a user selection of one of the scan objects is received (act 408). As discussed above, this user selection of a scan object can be made in any of a variety of manners, such as an audible input, highlighting of a scan object identifier displayed on a screen, and so forth.

Additionally, as discussed above the user can optionally override one or more of the image acquisition parameters and/or post-scan instructions. Accordingly, any user changes to the selected scan object are received (act 410). It is to be appreciated that act 410 is optional, and that in some situations no changes to the selected scan object are received.

Electronic documents are then created by scanning documents acquired using the image acquisition parameters in the selected scan object (act 412), optionally as overridden in act 410. The electronic documents and the post-scan instructions from the selected scan object (optionally as overridden in act 410) are sent to the service identified in the scan object as a scan job (act 414). This service is, for example, a repository processing service 224 of FIG. 2. Updates regarding the status of the scan job are optionally received from the service (act 416) and presented (e.g., displayed) to the user (act 418).

Figure 5:
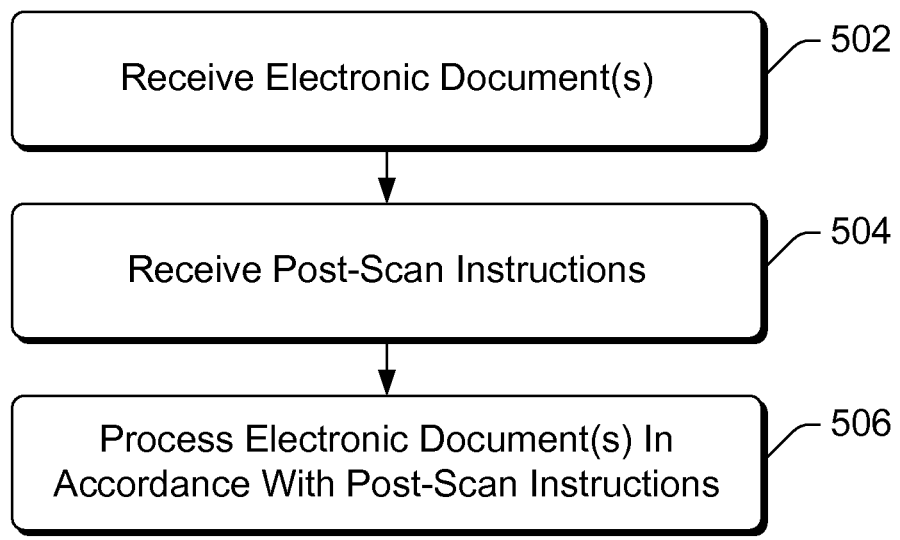
FIG. 5 is a flowchart illustrating an example process for performing post-scan operations based on a scan object in accordance with one or more embodiments.

FIG. 5 is a flowchart illustrating an example process 500 for performing post-scan operations based on a scan object in accordance with one or more embodiments. Process 500 is carried out by one or more services, such as repository service 228 of FIG. 2, or service 228 and repository processing service 224 of FIG. 2, and can be implemented in software, firmware, hardware, or combinations thereof.

Initially, one or more electronic documents are received from a scanner (act 502). The scanner created these electronic document(s) based at least in part on capabilities of the scanner that were previously identified by the scanner, as discussed above. Additionally, post-scan instructions are received (act 504). These post-scan instructions identify post-scan operations to be performed by the repository service, as discussed above.

The one or more electronic documents are then processed based at least in part on the post-scan instructions (act 506). As discussed above, this processing can take any of a variety of different forms, such as emailing documents, faxing documents, saving documents to a particular file, and so forth.

The object-based network scanning discussed herein creates a user-friendly system for using scanners. For example, a particular company may have a policy that expense reports from sales associates are to be emailed to three different individuals in an accounting department and saved to a particular folder. An administrator can generate a scan object with an "expense reports" identifier, the scan object including the desired image acquisition parameters (e.g., PDF documents in black and white with a 300 dots per inch (dpi) resolution) and the post-scan instructions identifying the email address of the three different individuals that are to receive the expense reports and an identifier of (e.g., file pathname) the folder in which the expense reports are to be saved. The administrator can also associate user access rights with the scan object so that only users that are part of a "sales associates" group can access the scan object.

Following this example, when a user that is a part of the sales associates group subsequently brings an expense report document and expense receipts to a scanner, he or she can present his credentials establishing that he is part of the sales associates group and select the "expense reports" scan object. He or she can then proceed to scan in the expense report document and expense receipts (e.g., placing them individually on the flat-bed scanner and pressing a "scan" button), and when finished can select a "done" or "end". The electronic documents generated from scanning his or her expense report and expense receipts are then forwarded to the repository identified in the scan object, where they are automatically emailed to the three email addresses identified in the scan object and saved in the folder identified in the scan object. Similar scan objects can be created by the user for handling expense reports from other groups, as well as for handling other types of documents.

As can be seen from this example, the object-based network scanning allows scan objects to be generated in a user-friendly manner. No specific programming knowledge for specific scanner manufacturers or types of scanners is needed on the part of the user(s) setting up the scan objects or using the scanners. Rather, the availability of particular capabilities are displayed to the user of the scanner management console, allowing him or her to easily select those he or she desires to include in a scan object. Additionally, the particular scan objects can be easily identified and selected by users of the scanners, without requiring any knowledge on the part of the user of the post-scan operations that are performed.

In the following Tables I-VI, an example implementation of operations and events supported by the object-based network scanning is discussed. It is to be appreciated that these operations and events are only examples, and that various other operations and/or events can be used in different embodiments.

Table I describes various operations that are supported by a scanner, such as by enterprise scan service 218 of scanner 206 FIG. 2. Table II describes various events that can be reported by a scanner, such as by enterprise scan service 218 of scanner 206 FIG. 2. These events are reported to any component or device registering to receive them, such as another component on scanner 206 of FIG. 2, a scanner management console 212 of FIG. 2, and so forth.

TABLE I

| Operation | Description |
| --- | --- |
| ValidateScanTicket | Allows a computing device to ask the scanner if the settings for a future scan operation are valid. This operation can be used, for example, by the computing device to validate changes, combinations of settings, and so forth. |
| GetScannerElements | Allows a computing device to request information about the scanner. This information includes any scanner data regarding the capabilities and/or operation of the scanner. Examples of this information include the configuration of the scanner, status of the scanner, default ScanTicket (e.g., default settings of the scanner), and so forth. |
| GetJobElements | Allows a computing device to access job-related information of a specified scan job. Examples of this information include the settings of the scanner for the scan job, the status of the scan job, and so forth. |
| GetActiveJobs | Allows a computing device to retrieve a list containing a summary of the currently active scan jobs. The list of scan jobs returned contains information such as an identifier(s) of the scan job, an identifier of the user originating the scan job, and so forth. More detailed information regarding a scan job can be retrieved using the GetJobElements operation. |
| GetJobHistory | Allows a computing device to retrieve a list containing a summary of some of the previously completed scan jobs. The list of jobs returned contains information such as an identifier(s) of the scan job, an identifier of the user originating the scan job, and so forth. More detailed information regarding a scan job can be retrieved using the GetJobElements operation. |

TABLE I-continued

| Operation | Description |
|---|---|
| | How much job history the scanner keeps can vary by implementation and by scanner. Each scanner can keep as much or as little history as it desires. |

TABLE II

| Operation | Description |
|---|---|
| ScannerElementsChangeEvent | Informs the recipient that something has changed in the configurations or settings of the scanner, such as a change in the description of the scanner, a change in the configuration of the scanner, a change in the default scan settings for the scanner, and so forth. |
| ScannerStatusSummaryEvent | Informs the recipient that the status of the scanner has changed. This event includes a summary description of the current status of the scanner. |
| ScannerStatusConditionEvent | Informs the recipient that the status of the scanner has changed, and includes detailed information about the status change in the scanner. |
| ScannerStatusConditionClearedEvent | Informs the recipient that a previously reported event (e.g., reported by the ScannerStatusConditionEvent) has been cleared. This event includes an identifier of the condition that has been cleared, and the time the condition was cleared. |
| JobStatusEvent | Informs the recipient that the status of a scan job has changed. The first message sent for a scan job typically includes an identifier of the job and a status of "started". |
| JobEndStateEvent | Informs the recipient that processing of the scan job at the scanner has finished. This event typically includes an identifier of the scan job. |

Table III describes various operations that are supported by a repository configuration service on a server, such as by repository configuration service 226 of FIG. 2. Table IV describes various events that can be reported by a repository configuration service, such as by repository configuration service 226 of FIG. 2. These events are reported to any component or device registering to receive them, such as another component on server 204 of FIG. 2, a scanner management console 212 of FIG. 2, a scanner 206 of FIG. 2, and so forth.

TABLE III

| Operation | Description |
|---|---|
| GetRepositoryElements | Allows a computing device to request information about the repository service. This information includes any repository service data regarding the capabilities and/or operation of the repository service. Examples of this information include the capabilities of the repository service, status of the repository service, and so forth. |
| GetPostScanJobElements | Allows a computing device or scanner to access job-related information of a specified scan job. Examples of this information include the post-scan instructions selected for the scan job, the status of the scan job, and so forth. |
| CancelPostScanJob | Allows a computing device or scanner to cancel a scan job previously submitted to the repository service. This operation typically includes an identifier(s) of the scan job to be canceled. |
| GetActiveJobs | Allows a computing device or scanner to retrieve a list containing a summary of the currently active scan jobs. The list of jobs returned contains information such as an identifier(s) of the |

TABLE III-continued

| Operation | Description |
|---|---|
| | scan job, an identifier of the user originating the job, and so forth. |
| GetJobHistory | Allows a computing device to retrieve a list containing a summary of some of the previously completed scan jobs. The list of scan jobs returned contains information such as an identifier(s) of the scan job, an identifier of the user originating the scan job, and so forth. How much job history the repository configuration service keeps can vary by implementation and by server. Each repository configuration service can keep as much or as little history as it desires. |

TABLE IV

| Operation | Description |
|---|---|
| RepositoryElementsChangeEvent | Informs the recipient that something has changed in the configurations or settings of the repository service, such as a change in the description of the repository service, a change in the configuration of the repository service, a change in the capabilities of the repository service, and so forth. |
| RepositorySummaryStatusEvent | Informs the recipient that the status of the repository service has changed. This event includes a description of the current status of the repository service. |
| PostScanJobStatusEvent | Informs the recipient that the status of a scan job has changed. The first message sent for a job typically includes an identifier of the scan job and a status of "started". |
| PostScanJobEndStateEvent | Informs the recipient that processing of the scan job by the repository service has finished. This event typically includes an identifier of the scan job. |

Table V describes various operations that are supported by a repository processing service on a server, such as by repository processing service 224 of FIG. 2. Table VI describes various events that can be reported by a repository processing service, such as by repository processing service 224 of FIG. 2. These events are reported to any component or device registering to receive them, such as another component on server 204 of FIG. 2, a scanner management console 212 of FIG. 2, a scanner 206 of FIG. 2, and so forth.

TABLE V

| Operation | Description |
|---|---|
| CreatePostScanJob | Allows the beginning of post-scan processing of a scan job to be requested. The request includes an identifier of the scan object used to create the images, the post-scan instructions, and optionally an identifier of the repository service. The repository processing service returns an identifier(s) for the newly created scan job. If the post-scan instructions are not supported by the repository service, then the repository processing service returns an indication of an error. |
| SendImage | Allows the scanner to send electronic documents it has scanned to the repository service. The request includes an identifier of the scan job, the electronic document, and optionally a description of the electronic document (e.g., number of pages, page size, etc.). |
| EndPostScanJob | Allows the scanner to identify the end of a scan job once all the electronic documents have been transferred from the scanner. The repository service rejects any subsequent SendImage operations for the identified scan job, and starts processing the post- |

TABLE V-continued

| Operation | Description |
|---|---|
| | scan instructions for the received electronic documents (if processing has not already started). This operation is submitted by the same user who submitted the CreatePostScanJob request. |
| CancelPostScanJob | Cancels a scan job identified by a scan job identifier(s) included in the request. The repository service cancels the scan job if this operation is submitted by the same user who submitted the CreatePostScanJob request. In one or more implementations, this cancel is a cancellation of any future processing and does not delete electronic documents already processed by the repository service (e.g., electronic documents already emailed, faxed, etc.). |
| GetPostScanJob Elements | Used to inquire about data elements of a particular scan job. This request message identifies a particular job and which data elements are to be returned. The repository service checks that the scan job identifier(s) is valid and returns the requested data elements. Examples of such data elements include a status of the scan job, a description of the scan job, post-scan instructions for the scan job, electronic documents of the scan job, and so forth. |

TABLE VI

| Operation | Description |
|---|---|
| PostScanJob StatusEvent | Informs the recipient that a change in the status of the scan job has changed. This event contains information describing the current status of the scan job. |
| PostScanJob EndStateEvent | Informs the recipient that a scan job has been completed. This event contains information describing the scan job, such as an identifier(s) of the scan job. |

Figure 6:
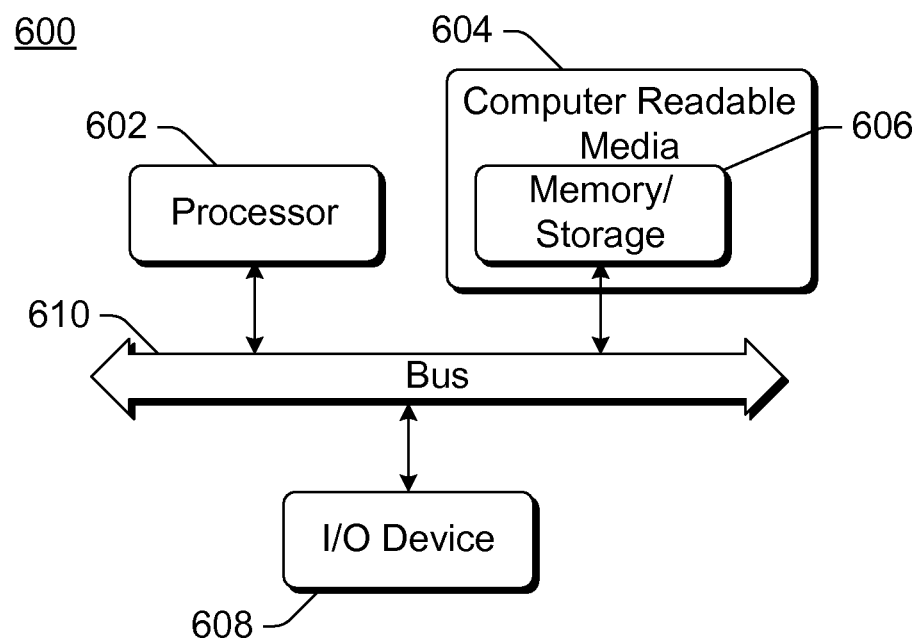
FIG. 6 illustrates an example computing device that can be configured to implement the object-based network scanning in accordance with one or more embodiments.

FIG. 6 illustrates an example computing device 600 that can be configured to implement the object-based network scanning in accordance with one or more embodiments. Computing device 600 can be, for example, a computing device 102 of FIG. 1 or computing device 202 of FIG. 2, a server 104 of FIG. 1 or server 204 of FIG. 2, a scanner 106 of FIG. 1 or scanner 206 of FIG. 2, can implement a scan object store 208 of FIG. 2, and so forth.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Computer readable media 604 and/or I/O device(s) 608 can be included as part of, or alternatively may be coupled to, computing device 600. Bus 610 represents one or more of any of several types of bus structures, including a memory bus or memory controller, a peripheral bus, an accelerated graphics port, and a processor or local bus using any of a variety of bus architectures. Bus 610 can include wired and/or wireless buses.

Memory/storage component 606 represents one or more computer storage media. Component 606 can include volatile media (such as random access memory (RAM)) and/or non-volatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by processing unit(s) 602. It is to be appreciated that different instructions can be stored in different components of computing device 600, such as in a processing unit 602, in various cache memories of a processing unit 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module," "functionality," and "logic" as used herein generally represent software, firmware, hardware, or combinations thereof. In the case of a software implementation, the module, functionality, or logic represents program code that performs specified tasks when executed on a processor (e.g., CPU or CPUs). The program code can be stored in one or more computer readable memory devices, further description of which may be found with reference to FIG. 6. The features of the object-based network scanning techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   identifying multiple scan objects available to a user of the scanner, wherein each of the multiple scan objects includes selected acquisition parameters of the scanner and selected post-scan instructions utilized by a repository service, the selected post-scan instructions based at least in part on capabilities of the repository service and the selected acquisition parameters based at least in part on one or more capabilities of the scanner;
   receiving a user selection of a scan object from the multiple scan objects, wherein the selected scan object includes a unique identifier associated with the selected post-scan instructions and the selected acquisition parameters and a provided document to create an electronic document, wherein receiving the user selection of the scan object comprises receiving selected acquisition parameters and selected post-scan instructions for the electronic document;
   based on the user selected scan object, creating the electronic document utilizing the selected acquisition parameters and the selected post-scan instructions;
   processing the electronic document in accordance with the selected post-scan instructions from the scan object, wherein a scan job comprises the electronic document and the processing of the electronic document in accordance with the selected post-scan instructions, the selected post-scan instructions identify one or more post-scan operations to be performed by a selected repository service, and the selected repository service is selected from a plurality of repository services;
   sending both the post-scan instructions in the selected scan object and the electronic document to the selected repository service identified in the scan object;
   receiving, from the selected repository service, a status of the scan job; and
   presenting the status of the scan job to the user.

2. A method as recited in claim 1, further comprising:
   receiving one or more acquisition parameters from the user; and
   replacing one or more of the acquisition parameters of the selected scan object with the one or more acquisition parameters received from the user.

3. A method as recited in claim 1, wherein identifying multiple scan objects available to a user of the scanner includes:
   receiving user credentials of the user;
   accessing a scan object store that maintains the multiple scan objects in order to identify the multiple scan objects that are available to the user; and
   receiving, from the scan object store, an identification of the multiple scan objects that are available to the user.

4. A method as recited in claim 1, wherein identifying multiple scan objects available to a user of the scanner includes:
   receiving, from a scan object store, objects that are associated with the scanner.

5. A method as recited in claim 1, further comprising:
   receiving, from a computing device, a request for acquisition parameters that are associated with the scanner; and
   in response to receiving the request, sending a list of the associated acquisition parameters to the computing device.

6. A method as recited in claim 1, wherein sending the post-scan instructions comprises sending the selected scan object to the repository service identified in the scan object.

7. A method as recited in claim 1, wherein sending the post-scan instructions comprises sending an identifier of the selected scan object to a repository processing service identified in the scan object.

8. A computer-readable storage device having stored thereon multiple instructions that, when executed by one or more processors, cause the one or more processors to:
   receive a selection of a repository service and a scanner;
   retrieve an indication of capabilities of the selected repository service, including one or more of (i) a list of active jobs at the selected repository service, and (ii) a list of jobs completed by the selected repository service;
   retrieve an indication of capabilities of the selected scanner;
   present, to a user, one or more of (i) the retrieved capabilities of the selected repository service and the retrieved capabilities of the selected scanner, and (ii) one or more of the list of active jobs at the selected repository service and the list of jobs completed by the selected repository service;
   receive a user selection of one or more of the presented capabilities of the selected repository service and one or more of the presented capabilities of the selected scanner;
   generate a scan object including both selected acquisition parameters based on the selected one or more capabilities of the selected scanner and selected post-scan instructions based on the selected one or more of the presented capabilities of the selected repository service;
   apply selected post-scan instructions to an electronic document created from a provided document;
   process the electronic document in accordance with the selected post-scan instructions from the scan object, wherein a scan job comprises the electronic document and the processing of the electronic document in accordance with the selected post-scan instructions and the selected post-scan instructions identify one or more post-scan operations to be performed by the selected repository service;
   and
   store the scan object for subsequent access by the selected scanner, wherein the scan object is stored with a unique identifier associated with the selected post-scan instructions and the selected acquisition parameters.

9. A computer-readable storage device as recited in claim 8, wherein the instructions further cause the one or more processors to store user access rights associated with the scan object, the user access rights identifying one or more users to whom the scan object is available.

10. A computer-readable storage device as recited in claim 8, wherein the instructions further cause the one or more processors to:
    retrieve an indication of capabilities of one or more additional repository services;
    present, to the user, the capabilities of the one or more additional repository services; and
    wherein receiving the user selection of one or more of the presented capabilities includes receiving a user selection of capabilities of one of the one or more additional repository services.

11. A computer-readable storage device as recited in claim 8, wherein retrieving the indication of capabilities of the repository service includes retrieving the indication of capabilities of the selected repository service from a repository configuration service running on a same server as the selected repository service.

12. A computer-readable storage device having stored thereon multiple instructions that, when executed by one or more processors, cause the one or more processors to:
   receive, from a scanner, one or more electronic documents acquired by the scanner;
   receive a selected scan object, wherein the scan object includes a unique identifier, selected image acquisition parameters based at least in part on one or more capabilities of the scanner and selected first post-scan instructions, wherein the selected first post-scan instructions identify one or more post-scan operations to be performed by a selected repository service, the selected repository service being selected from a plurality of repository services and the selected first post-scan instructions based at least in part on capabilities of the selected repository service, wherein the unique identifier is associated with the selected post-scan instructions and the selected image acquisition parameters; and
   process the one or more electronic documents based at least in part on the first post-scan instructions.

13. A computer-readable storage device as recited in claim 12, wherein the first post-scan instructions are received from the scanner.

14. A computer-readable storage device as recited in claim 12, wherein the instructions further cause the one or more processors to send a status to the scanner regarding the processing of the first post-scan instructions.

15. A computer-readable storage device as recited in claim 12, wherein the instructions further cause the one or more processors to send a status to a scanner management console regarding the processing of the first post-scan instructions, the scan object having been generated at the scanner management console.

16. A computer-readable storage device as recited in claim 12, the instructions further causing the one or more processors to:
   receive one or more additional post-scan instructions from the scan object, each of the one or more additional post-scan instructions identifying post-scan operations to be performed by one repository service of the plurality of repository services; and
   send a status each time any of the first or one or more additional post-scan instructions are completed.

17. A computer-readable storage device as recited in claim 16, wherein sending a status comprises:
   determining at least one reason to send the status, the at least one reason being selected from a group consisting of: (a) a scan job being submitted by a particular scanner, (b) a scan job being submitted by a particular user of a particular scanner, and (c) a request for the status is received from a scanner management console.

18. A computer-readable storage device of claim 12, wherein the instructions further causing the one or more processors to receive a status of a scan job, the status of the scan job indicating an error with a post-scan instruction such that the scan job cannot be completed.

19. A computer-readable storage device as recited in claim 12, the instructions further causing the one or more processors to:
   receive one or more additional post-scan instructions from the scan object, each of the one or more additional post-scan instructions identifying one or more additional post-scan operations to be performed by one repository service of the plurality of repository services;
   determine, responsive to a request to cancel the one or more additional post-scan operations, future processing of a scan job; and
   cancelling, the future processing.

20. A computer-readable storage device as recited in claim 8, wherein storing the scan object for subsequent access comprises storing the scan object in a scan store, wherein the scan store is implemented as a directory service.

* * * * *